United States Patent Office 3,346,643
Patented Oct. 10, 1967

3,346,643
DIFLUORAMINO GLYCOLS AND THEIR
PREPARATION
Samuel Franklin Reed, Jr., Huntsville, Ala., assignor to Rohm & Haas Company, Philadelphia, Pa., a corporation of Delaware
No Drawing. Filed Oct. 24, 1962, Ser. No. 234,278
10 Claims. (Cl. 260—584)

This invention concerns high energy glycols. More specifically, it concerns glycols containing difluoramino substituents. It also concerns processes for the preparation of these glycols.

The glycols of the present invention can be reacted with a large number of compounds, typical of which are dibasic acids, both saturated and unsaturated, unsaturated acid chlorides such as acryloyl chloride and methacryloyl chloride, isocyanates and vinyl isocyanates. Particularly when the compound that the glycol is reacted with contains polymerizable double bonds, the resulting compounds are of interest as high energy binders for propellant or explosive grains.

These high energy glycols can be nitrated to give compounds containing $NF_2$ and nitrato groups, which compounds are of interest as high energy plasticizers for propellant grains in which nitrocellulose or other high energy polymers are used as the binders.

The glycols of the present invention are prepared by reacting a substituted 1,3-dioxolane with tetrafluorohydrazine, $N_2F_4$. The $N_2F_4$ adds to the double bond, and subsequent hydrolysis of the adduct with dilute acid gives the glycols. The substituted 1,3-dioxolanes are of the general formula

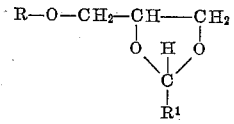

in which R is $CH_2=CH-$, $CH_2=CH-CH_2-$,

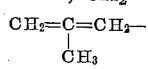

and $CH_2=CH-CH_2-CH=CH-CH_2-$, $R^1$ is H or lower alkyl C 1 to 4. Since $R^1$ is removed during hydrolysis and does not appear in the final product, $R^1$ is preferably hydrogen or methyl.

Typical preparations of substituted 1,3-dioxolanes, operable in the present invention, are given in U.S. Patent No. 2,969,400.

The reaction of $N_2F_4$ with the dioxolane is generally conducted in a solvent, and any solvent which is inert, i.e. does not react with the reactants or the resulting product, is suitable for use. Typical of these are carbon tetrachloride, chloroform, methylene chloride, tetrachloroethane, chlorobenzene, and acetone.

The reaction temperature may be varied from ambient, i.e. 20° to 25° C., to as high as 150° C. However, since the rate of reaction is very slow at low temperatures and proceeds rapidly at high temperatures, it is preferred to use an elevated temperature, preferably in the range 70° to 80° C. One limitation on the use of excessively high temperatures is that the reaction proceeds so violently that it is necessary to use large amounts of solvents to dissipate the heat.

The reaction may be carried out at pressures which range from sub-atmospheric, for example, 0.5 atm., to 20 to 30 atmospheres.

With the substituted 1,3-dioxolanes used as starting materials in the present invention, one mole of $N_2F_4$ is all that is theoretically required for each double bond. However, an excess of $N_2F_4$ is preferred, since the excess can be easily recovered from the reaction mixture. Since it is preferred that the reaction be conducted at super-atmospheric pressure, $N_2F_4$ is fed to the reaction mixture until no further pressure drop occurs.

Typical of the reaction is the reaction of 2-methyl-4-vinoxymethyl-1,3-dioxolane with $N_2F_4$ to give 2-methyl-4-((1,3 - bisdifluoramino)ethoxymethyl) - 1,3,-dioxolane. This product is then hydrolyzed with dilute acid, mineral acids being preferred, HCl being particularly preferred. The bis(difluoramino)dioxolane prepared as described hereinbefore has limited solubilities in dilute acids and it is preferred to add methanol to the solution to increase the solubility of the dioxolane, thus increasing the reaction rate. The preferred ratio of methanol to the aqueous acid solution is approximately 1:1, but it can be varied widely and still be within the scope of this invention.

The products of the present invention have the following general formula $$R^2C-CH_2-CH-CH_2$$
$$\phantom{R^2C-CH_2-}\overset{|}{O}H\ \overset{|}{O}H$$

in which $R^2$ is selected from the group consisting of

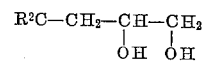

and

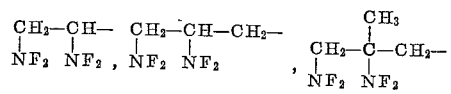

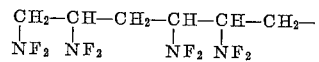

The following examples, in which all parts are by weight, serve further to illustrate the process of this invention and the products thereof. These examples should not be construed as restrictions upon the scope of this invention.

EXAMPLE I

*Reaction of tetrafluorohydrazine with 2-methyl-4-vinoxymethyl-1,3-dioxolane*

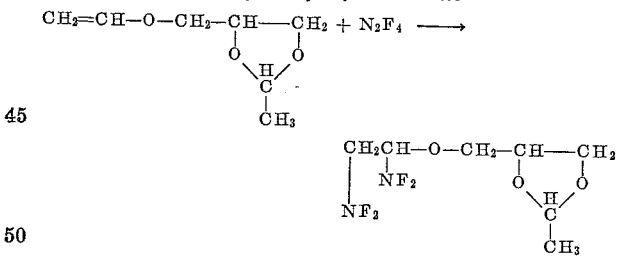

To a glass aerosol tube of 100 ml. capacity was introduced 8.6 grams (0.05 mole) 2-methyl-4-vinoxymethyl-1,3-dioxolane and 30 ml. of carbon tetrachloride. The tube was then placed in position on a high pressure manifold, degassed thoroughly under vacuum, then flushed and degassed three times with nitrogen. Tetrafluorohydrazine was then introduced into the reactor tube to give an initial pressure of 83 p.s.i. An initial pressure drop was due to absorption of tetrafluorohydrazine in solvent. After recharging to 83 p.s.i. with tetrafluorohydrazine, the mixture was heated to 80° C. During the next three hours, the tetrafluorohydrazine pressure was maintained between 83–39 p.s.i. by recharging the system at frequent intervals. The total number of recharges was ten. The heating bath was lowered and, after cooling, the excess tetrafluorohydrazine was vented to the air. The reactor was then flushed with nitrogen and degassed three times after which air was introduced into the reactor and it was allowed to stand for a period of fifteen minutes. The aerosol tube with contents was then removed from the manifold, poured into a 100 ml. flask, and the solvent removed on a rotary stripper at reduced pressure. The residue obtained weighed 13.7 grams (99%) and was identified as 2-methyl-4-((1,2-bisdifluoramino)ethoxymethyl)-1,3-dioxolane by its infrared spectrum and elemental analysis.

*Analysis.*—Calculated for $C_7H_{12}F_4N_2O_3$: C, 33.85%; H, 4.84%; F, 30.65%; N, 11.28%. Found: C, 35.09%; H, 5.16%; F, 29.70%; N, 11.17%.

*Hydrolysis of 2-methyl-4-((1,2-bisdifluoramino)ethoxymethyl)-1,3-dioxolane*

To a 300 ml. flask fitted with magnetic sitrrer containing 90 ml. water, 10 ml. concentrated hydrochloric acid and 100 ml. methanol was added 13.8 grams (0.05 mole) 2-methyl-4-((1,2-bisdifluoramino)ethoxymethyl) - 1,3-dioxolane. The mixture was stirred at ambient temperature for a period of twenty-four hours. After removal of the methanol at reduced pressure, the aqueous solution was extracted with three 100 ml. portions of ether. The ether extracts were combined, washed once with water and dried over anhydrous magnesium sulfate. The ether was removed at reduced pressure to yield 9.65 grams (87%) of a clear viscous residue identified by its infrared spectrum and elemental analysis as 3-((1,2-bisdifluoramino)ethoxy)-1,2-propanediol. Characterization was carried out on the crude diol.

*Analysis.*—Calculated for $C_5H_{10}F_4N_2O_3$: C, 27.03%; H, 4.50%; F, 34.24%; N, 12.63%. Found: C, 28.99%; H, 4.98%; F, 32.10%; N, 13.36%.

I claim:

1. Compounds of the general formula

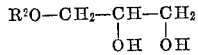

in which $R^2$ is selected from the group consisting of

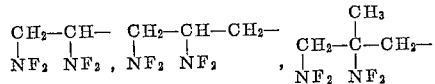

and

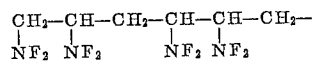

2. A compound of the formula

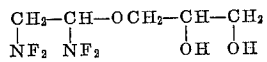

3. A compound of the formula

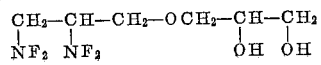

4. A compound of the formula

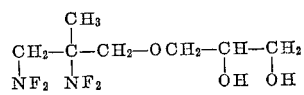

5. A compound of the formula

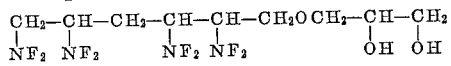

6. A process for the preparation of the compounds of claim 1 which comprises reacting
   (A) the substituted 1,3-dioxolane of the general formula

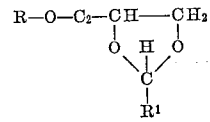

in which R is selected from the group consisting of

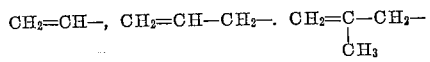

and

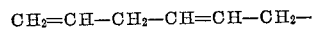

and
   $R^1$ is selected from the group consisting of hydrogen and lower alkyl containing 1 to 4 carbon atoms;
   (B) tetrafluorohydrazine, $N_2F_4$; and
   (C) hydrolyzing the reaction product of (A) and (B) by treatment with dilute acid.

7. A process as set forth in claim 6 in which the reaction temperature is from 20° to 150° C.

8. A process as set forth in claim 6 in which the reaction is conducted under an $N_2F_4$ pressure of 0.5 to 30 atmospheres.

9. A process as set forth in claim 6 in which the acid is dilute aqueous hydrochloric acid.

10. A process as set forth in claim 8 in which methanol is added to the aqueous dilute hydrochloric acid.

References Cited

UNITED STATES PATENTS 3,215,709  11/1965  Logothetis _____ 260—349

CHARLES B. PARKER, *Primary Examiner.*

L. D. ROSDOL, *Examiner.*

J. W. WHISLER, B. BILLIAN, *Assistant Examiners.*